No. 647,530. Patented Apr. 17, 1900.
E. SCHNEIDER.
SHUTTER FOR KINETOSCOPES.
(Application filed Dec. 15, 1899.)
(No Model.)
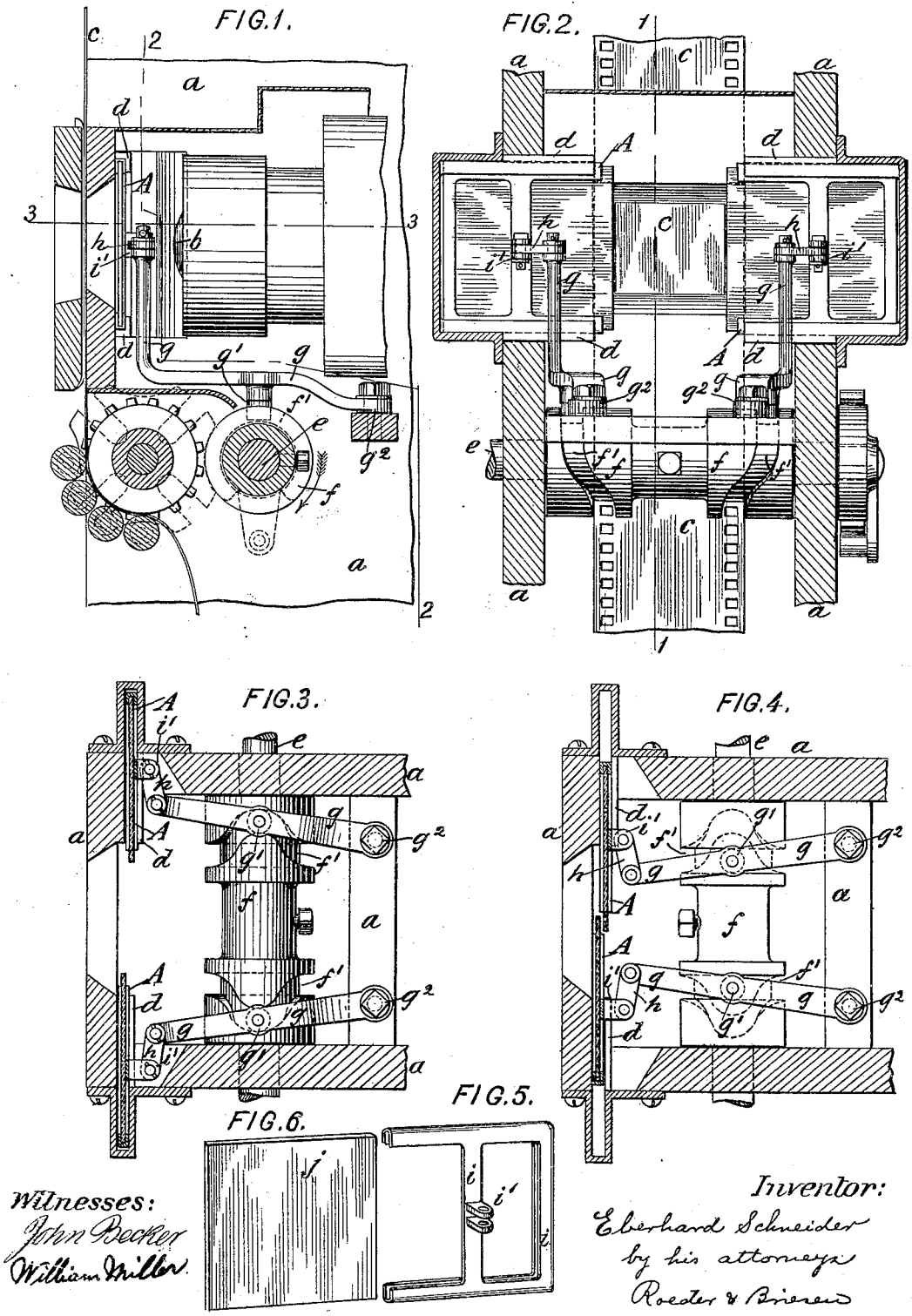
Witnesses:
John Becker
William Miller
Inventor:
Eberhard Schneider
by his attorneys
Roeder & Bresen

UNITED STATES PATENT OFFICE.

EBERHARD SCHNEIDER, OF NEW YORK, N. Y.

SHUTTER FOR KINETOSCOPES.

SPECIFICATION forming part of Letters Patent No. 647,530, dated April 17, 1900.

Application filed December 15, 1899. Serial No. 740,393. (No model.)

*To all whom it may concern:*

Be it known that I, EBERHARD SCHNEIDER, a citizen of Germany, and a resident of New York city, county and State of New York, have invented new and useful Improvements in Shutters for Kinetoscopes, of which the following is a specification.

This invention relates to an improved shutter for kinetoscopic cameras and projecting kinetoscopes which is so constructed that a rapid and positive opening-and-closing action is obtained and that the shutter-actuating mechanism will occupy but a very small space between the shutter and the objective lens. In this way the film, shutter, and lens may be arranged closely together, and thus an undesirable diffusion of light is prevented.

In the accompanying drawings, Figure 1 is a sectional side view on line 1 1, Fig. 2, of part of a kinetoscopic camera provided with my improved shutter. Fig. 2 is a section on line 2 2, Fig. 1; Fig. 3, a horizontal section on line 3 3, Fig. 1, showing the shutter open. Fig. 4 is a similar section showing the shutter closed. Fig. 5 is a perspective view of the shutter-frame; and Fig. 6, a similar view of plate $j$.

The letter $a$ represents the frame of a kinetoscopic camera, $b$ the objective lens, and $c$ the film; all as usual. Between the lens and film are arranged a pair of reciprocating shutters A, sliding laterally in upper and lower guides $d$.

The mode of imparting motion to the shutters A is as follows: Upon a shaft $e$, which is rotated in suitable manner, is mounted a cam $f$, arranged between and below the shutters and having a pair of cam-grooves $f'$, that are set in opposite directions. The grooves $f'$ are engaged by rollers $g'$ of elbow-levers $g$, pivoted to frame $a$ at $g^2$. The upwardly-extending arms of levers $g$ are by pivoted links $h$ connected to lugs $i'$, projecting from the frames $i$ of shutters A. By rotating shaft $e$ the levers $g$ will be rapidly vibrated upon their pivots $g^2$, so as to rapidly reciprocate the shutters A and cause them to alternately open and close. It will be seen that the mechanism for operating the shutters occupies but very little of the space between the shutters and the lens $b$, such mechanism being placed mainly below the lens-tube. In this way the film may be arranged in close proximity to the lens, so that a diffusion of the rays of light will be prevented and a sharply-outlined picture will result.

The shutter A is composed, preferably, of an open frame $i$, Fig. 5, and of a removable plate $j$, Fig. 6, which may be fitted within such frame.

For projecting kinetoscopes the plate $j$ should be provided with a reflecting-surface on one or both sides, while with kinetoscopic cameras a dead-black surface is desirable. With the former class of machines practical tests have demonstrated that a shutter having a mirror or reflecting-surface displays an image which is by far more clear than that displayed by a differently-constructed shutter. The reason for this is, as I believe, that a mirror does not mix any lines into the sight-opening at the time the picture is exposed. The mirror-shutter, though impenetrable to rays of light, comes nearest in effect to that of pure air, and therefore occasions the least blurring of the sight-opening, as can be readily demonstrated by revolving a mirror-shutter and a milky-white shutter side by side. For kinetoscopic cameras, however, a dead-black surface is necessary, because reflection should be avoided, and the light must be shut off completely when the shutter is closed.

What I claim is—

In a kinetoscope-shutter, the combination of a pair of laterally-sliding shutters, with a cam arranged between and below the shutters and having oppositely-set grooves, a pair of elbow-levers having upwardly-extending arms, rollers on the elbow-levers that engage the cam-grooves, and means for pivotally connecting the upwardly-extending arms of the elbow-levers with the shutters, substantially as specified.

EBERHARD SCHNEIDER.

Witnesses:
WILLIAM SCHULZ,
F. V. BRIESEN.